United States Patent [19]

Boucherie

[11] Patent Number: 5,746,482
[45] Date of Patent: May 5, 1998

[54] BRUSH BODY FEEDING DEVICE

[75] Inventor: Leonel Polydore Boucherie, Izegem, Belgium

[73] Assignee: G.B. Boucherie N.V., Belgium

[21] Appl. No.: 736,352

[22] Filed: Oct. 23, 1996

[30] Foreign Application Priority Data

Dec. 19, 1995 [EP] European Pat. Off. ............ 95120023

[51] Int. Cl.⁶ .................................................. A46D 3/00
[52] U.S. Cl. ................................................... 300/11
[58] Field of Search ............................ 300/2–11, 21

[56] References Cited

U.S. PATENT DOCUMENTS 5,104,196  4/1992  Boucherie .............................. 300/11 X

FOREIGN PATENT DOCUMENTS

| 0035813 | 9/1981 | European Pat. Off. . |
| 0105555 | 4/1984 | European Pat. Off. . |
| 2556710 | 6/1977 | Germany . |
| 3139050 | 4/1983 | Germany . |
| 3424681 | 2/1986 | Germany . |

*Primary Examiner*—Mark Rosenbaum
*Attorney, Agent, or Firm*—Sixbey, Friedman, Leedom & Ferguson, P.C.; Gerald J. Ferguson, Jr.; Tim L. Brackett, Jr.

[57] ABSTRACT

A brush body feeding device for feeding individualized brush bodies from a collective supply (18) to a tufting station in a brush making machine comprises a discharging device (10) for successively discharging individual brush bodies from the collective supply (18). A delivering device (14) delivers brush bodies to the tufting station in a continuous stream of aligned brush bodies. A storage conveyor (36) is arranged between the discharging device (10) and the delivering device (14) performs a buffering function to compensate for any inconsistent operation of the discharging device (10).

18 Claims, 1 Drawing Sheet

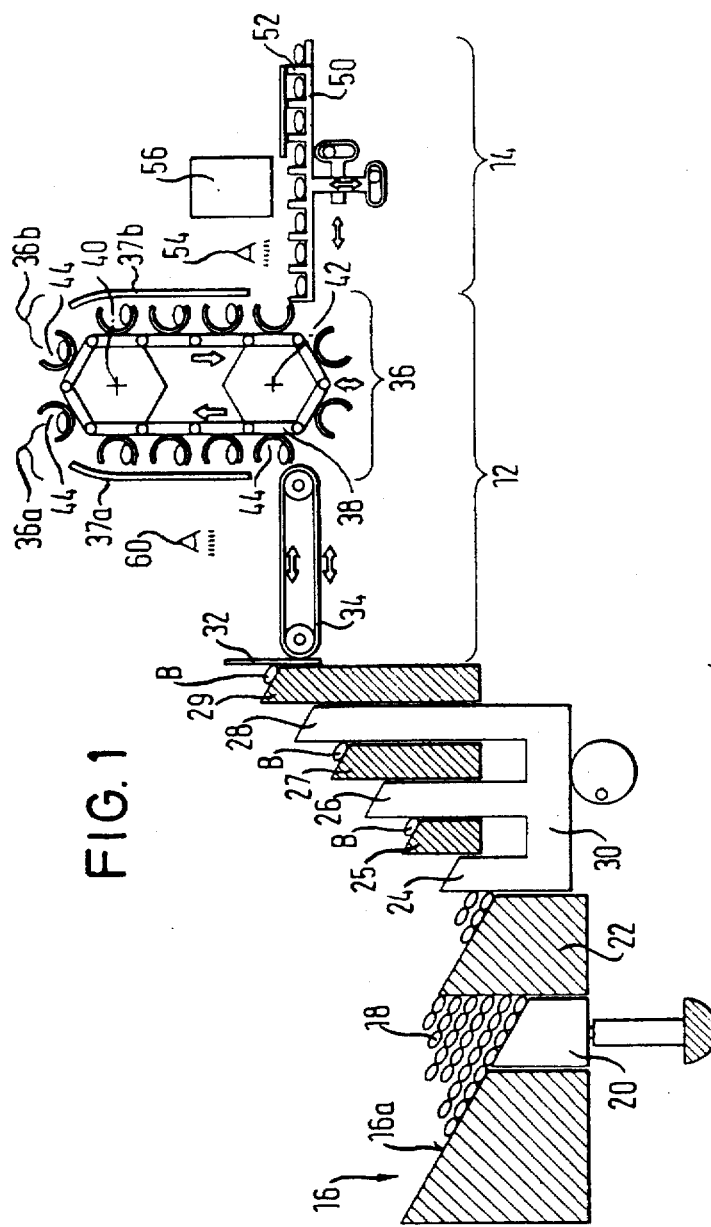
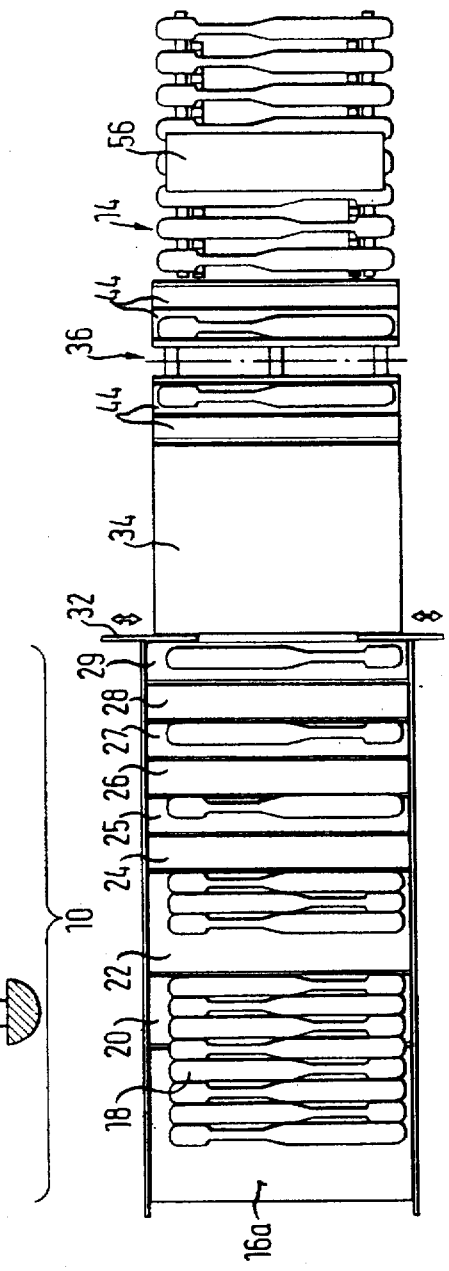
FIG. 1
FIG. 2

BRUSH BODY FEEDING DEVICE

The present invention relates to a brush body feeding device for feeding individualized brush bodies from a collective supply to a tufting station in a brush making machine.

In a brush making machine, individual brush bodies provided with holes for the insertion of tufts of bristles are fed to a tufting station where tufts of bristles are implanted in those holes. To ensure continuous operation of the tufting station, the brush bodies must be reliably and consistently supplied. Various types of brush body feeding devices have been used in the past. For example, EP 0 105 555 B1 discloses a brush body feeder with a large bin accommodating a stock of brush bodies oriented more or less at random. The bin has an inclined bottom with a vertically reciprocating pusher member at the lowermost portion of the bottom. The pusher member engages a number of brush bodies to lift them past an edge of an upright wall which, on the side facing away from the pusher member, is connected to a chute. Brush bodies sliding down the chute are then engaged by another pusher member which is likewise reciprocated vertically and has a width corresponding substantially to that of the brush bodies to improve the chances that only one brush body will be lifted at a time and pushed past an edge of a further chute member. The pusher and chute member are followed by further sets of pusher and chute member combinations, all pusher members being driven by a common reciprocating slide. In each chute/pusher member combination, the likelihood that only one brush body is supplied at a time, is increased. With a total number of five reciprocating pusher members, a satisfactory individualization of brush bodies is achieved.

With a brush body feeder of this type, however, a consistent stream of regularly spaced brush bodies cannot be achieved. While brush bodies may be regularly supplied for some time, the output of the device may occur in waves, causing the tufting station to stop and wait for new brush bodies. At other times, the brush body feeder may be forced to stop operation to permit a corrective alignment of the brush bodies supplied to the tufting station.

The present invention provides a brush body feeding device which supplies a consistent stream of properly aligned brush bodies to ensure continuous operation of the tufting station. In accordance with the invention, the brush body feeding device comprises a discharging device for successively discharging individual brush bodies from a collective supply. A delivering device is provided for delivering brush bodies to the tufting station preferably in a continuous stream of aligned brush bodies. A storage conveyor is arranged between the discharging device and the delivering device and has a plurality of accommodations for a single brush body each. The storage conveyor is controlled to present any of its accommodations to the discharging device for receiving a single brush body therein, and to present any of these accommodations to the delivering device for transferring a single brush body from the accommodation to the delivering device. The storage conveyor forms a buffer holding a sufficient number of brush bodies to compensate for any gap in the flow of brush bodies supplied by the discharging device. Although the operation of the discharging device is inherently inconsistent, a continuous stream of brush bodies is provided downstream from the storage conveyor. The tufting station must never wait for brush bodies, and interruptions of production time are avoided. The presence of the storage conveyor also makes the feeding process less critical, allowing the discharging device to feed brush bodies at a higher rate, whereby operation of the entire brush making system is enhanced.

Since a consistent feed of brush bodies is achieved in spite of the inherently inconsistent operation of the discharging device, it is not necessary to adjust the components of the discharging device to the dimensions of the particular brush bodies processed in an attempt to improve its operation, achieving additional benefits in terms of simplicity and adjustment time.

In a preferred embodiment, the delivering device is associated with an orientation correction device which monitors the orientation of the brush bodies coming from the storage conveyor, and corrects any misorientation to produce a stream of consistently aligned and mutually spaced brush bodies.

The storage conveyor is preferably provided as a closed-loop conveyor, to minimize the travel of accommodations between the respective input and output positions.

Further objects and features of the invention will become apparent from the following description of a preferred embodiment with reference to the drawings. In the drawings:

FIG. 1 is a diagramatic side view of the brush body feeding device; and

FIG. 2 is a diagramatic plane view of the device.

The brush body feeding device is generally composed of three units, a brush body discharging device 10, a brush body buffer unit 12 and a brush body orientation correction device 14.

The brush body discharging device 10 is generally similar to that disclosed in EP 0 105 555 B1. It comprises a bin 16 for accommodation of a stock 18 of brush bodies, with an inclined wall 16a and a vertically reciprocating pusher member 20 at the lowermost portion of the bin. The pusher member 20 cooperates with a chute member 22 which forms a vertical wall of the bin 16. Any brush body lifted by the reciprocating pusher member 20 past the upper edge of the chute member 22 will slide down the latter until it encounters one of the three further pusher members 24, 26 and 28 which are connected to a common vertically reciprocating slide 30. Each of the pusher members 24, 26, 28 is associated with a corresponding chute member 25, 27 and 29, and each subsequent chute member reaches a level higher than that of the preceding chute member.

A gate 32 is associated with the last one 29 of the chute members. Gate 32, when closed, retains a brush body B resting on chute member 29.

The brush body buffer unit 12 includes a horizontally extending conveyor belt 34 and a storage conveyor 36. The conveyor belt 34 has one end adjacent gate 32, slightly lower than the top of chute member 29 and one end close to the storage conveyor 36. The conveyor belt 34 is moveable in either of two opposite horizontal directions, as indicated by a pair of double arrows in FIG. 1. The storage conveyor 36 is a closed-loop conveyor with a drive chain 38 engaged about a pair of wheels 40, 42, the horizontal axes of which are vertically spaced from each other. The drive chain 38 carries a number of bucket members 44 which are arcuate in cross-section and are fixedly attached to the links of the drive chain 38.

In the particular embodiment shown, the storage conveyer 36 has two vertically extending conveyor sections 36a, 36b comprising four bucket members 44 each, interconnected by upper and lower arcuate sections comprising two bucket members 44 each. The drive chain 38 can move in either of two opposite peripheral directions, as indicated by a pair of arrows in FIG. 1. In addition, the storage conveyor 36 is movable up and down in stepped manner to selectively present each of the four bucket members 44 on conveyor section 36a or 36b to the conveyor belt 34, or to the delivering device 14.

The delivering device 14 comprises a horizontally extending alignment member 50 formed by a table carrying a number of longitudinally spaced separators 52. As indicated by a pair of double arrows in FIG. 1, the alignment member 50 is reciprocated both horizontally and vertically. An inspection device 54 and an orientation correction device 56 are associated with the alignment member 50. The inspection device 54 can distinguish the orientation of each brush body passing thereunder to direct the correction device 56 to change the orientation of any misaligned brush body.

In operation, a stock 18 of brush bodies is always available in bin 16. When pusher member 20 is raised, a number of brush bodies, five in FIG. 1, are pushed beyond the edge of chute member 22 and will slide down the sloping upper surface thereof until downward movement is stopped by pusher member 24. The width of pusher member 24 is somewhat greater than that of the brush bodies, and reciprocating pusher member 24 will most likely engage only one brush body to push it beyond the edge of chute member 25. Pusher member 26, which reciprocates in unison with pusher members 24 and 28, will in turn lift brush body B and cause it to slide down chute member 27, and pusher member 28 will push another brush body B past the edge of chute member 29, where brush body B is retained by gate 32. Thus, individualization of brush bodies occurs in successive steps, and in each step the likelihood of a successful individualization is increased. However, operation of the discharging device 10 is inherently inconsistent and the device may fail to supply an individualized brush body, or more than one brush body at a time.

Gate 32 remains closed until at least one of the bucket members 44 is empty. In this event, gate 32 opens and brush body B drops onto belt conveyor 34. Storage conveyor 36 performs the required indexing movements of drive chain 38 and/or upward or downward indexing movement to present the empty bucket member to conveyor belt 34. After conveyor belt 34 has discharged a brush body into the bucket member 44, the storage conveyor 36 is controlled to present one of the bucket members 44 containing a brush body to the input side of the delivering device 14. By combined upward/downward and peripheral indexing steps of storage conveyor 36, any of its bucket members 44 can be presented to the output side of conveyor belt 34 or to the input side of delivering device 14.

Between each pairs of separators 52 of alignment member 50, a space for receiving one and only one brush body is defined. When the first space on the input side of delivering device 14 is empty, a brush body is discharged from one of the bucket members 44 and loaded into such space.

Brush bodies passing below inspection device 54 are monitored to determine their orientation. As is seen in FIG. 2, each brush body has a handle section and a head section. For proper operation of the tufting station, the brush bodies supplied thereto must have a consistent orientation, i.e. the head sections must all be on the same side. Device 56 is provided to correct any misorientation of arriving brush bodies. This device is conventional and may contain a rotary gripper arm; it will not be disclosed further.

It is thus seen that the storage conveyor 36 performs a buffering function to ensure a continuous delivery of brush bodies by the delivering device 14. Due to this buffering function, the inconsistent behaviour of the discharging device 10 can no longer disturb the output flow of the brush body feeding system. An important feature of the storage conveyor 36 is that brush bodies are stored individually in each bucket member 34, so that any interferences between brush bodies are avoided.

Another feature of the brush body feeding device is the provision of an inspection device 60 associated with the conveyor belt 34. The inspection device 60 detects any multiple feed of brush bodies on conveyor belt 34. In the event of a multiple feed, conveyor belt 34 is driven in a direction opposite to the normal feeding direction after a brush body has been loaded into a bucket member 44, so that only one brush body will be loaded at a time. Therefore, a multiple feed by the discharging device 10 can be tolerated. As a consequence, the width of pusher members 24, 26 and 28 need not be closely matched to that of the brush bodies processed, whereby the device is considerably simplifed and frequent adjustment operations are not required.

As is readily apparent in FIG. 1, the brush bodies are loosely held in each bucket member 44 by gravity and due to the arcuate shape of each bucket member. To prevent brush bodies from dropping out of the bucket members upon rapid indexing movements of the storage conveyor 36, vertical sections 36a and 36b each have a shield 37a, 37b covering the open side of the bucket members 44.

I claim:

1. A brush body feeding device for feeding individualized brush bodies from a collective supply to a tufting station in a brush making machine, comprising a discharging device for successively discharging individual brush bodies from said collective supply, a delivering device for delivering brush bodies to said tufting station, and a storage conveyor arranged between said discharging device and said delivering device and having a plurality of accommodations for a single brush body each, said storage conveyor being controllable to present any of said accommodations to said discharging device for receiving a single brush body therein, and to present any of said accommodations to said delivering device for transferring a single brush body from said accommodation to said delivering device, said delivering device comprising alignment means for aligning individualized brush bodies in a continuous stream of aligned brush bodies.

2. The device of claim 1, wherein said storage conveyor is a closed-loop conveyor.

3. The device of claim 1, wherein said discharging device is of the type comprising a bin with an inclined bottom and a plurality of reciprocating members cooperating with stationary members.

4. The device of claim 3, wherein said reciprocating members are vertically reciprocating pusher members and said stationary members are chute members.

5. The device of claim 3 or claim 4, wherein said discharging device is provided with a gate which temporarily retains a brush body resting on a stationary member as long as all accommodations of said storage conveyor are filled.

6. The device of claim 1, wherein said delivering device is associated with an orientation correction device which produces a stream of continuous consistently aligned and mutually spaced brush bodies.

7. The device of claim 1, wherein a transfer conveyor is provided between said discharging device and said storage conveyor.

8. The device of claim 7, wherein said transfer conveyor selectively moves in either of two opposite horizontal directions.

9. The device of claim 1, wherein said storage conveyor selectively moves said accommodations in either of two opposite peripheral directions.

10. The device of claim 9, wherein said storage conveyor selectively moves in either of two opposite vertical directions.

11. The device of claim 1, wherein said accommodations are bucket-shaped.

12. The device of claim 11, wherein said bucket-shaped accommodations are each fixedly held on a closed-loop drive member.

13. The device of claim 11 or claim 12, wherein each bucket-shaped accommodation is arcuate in cross-section.

14. The device of claim 11 or claim 12, wherein said storage conveyor has at least one shield member associated therewith to prevent brush bodies from dropping out of said bucket-shaped accommodations.

15. The device of claim 1, wherein said storage conveyor has two vertically extending sections interconnected by upper and lower arcuate sections.

16. The device of claim 1, wherein said delivering device has a generally horizontal alignment member with a plurality of separators holding aligned brush bodies in mutually spaced relationship.

17. The device of claim 16, wherein said alignment member is reciprocated both horizontally and vertically.

18. A brush body feeding device for feeding individualized brush bodies from a collective supply to a tufting station in a brush making machine, comprising a discharging device for successively discharging individual brush bodies from said collective supply, a delivering device for delivering brush bodies to said tufting station, and a storage conveyor arranged between said discharging device and said delivering device and having a plurality of accommodations for a single brush body each, said storage conveyor being controllable to present any of said accommodations to said discharging device for receiving a single brush body therein, and to present any of said accommodations to said delivering device for transferring a single brush body from said accommodation to said delivering device, wherein said delivering device is associated with an orientation correction device which produces a stream of continuous consistently aligned and mutually spaced brush bodies.

* * * * *